United States Patent [19]

Katayama et al.

[11] Patent Number: 4,814,406
[45] Date of Patent: Mar. 21, 1989

[54] SCALE INHIBITOR

[75] Inventors: Sakae Katayama, Osaka; Tadahiko Asano, Sennan; Masatsune Okuma, Kyoto; Keisyo Nakanishi, Nara, all of Japan

[73] Assignee: Katayama Chemical Works Ltd., Osaka, Japan

[21] Appl. No.: 15,890

[22] Filed: Feb. 18, 1987

[30] Foreign Application Priority Data

Feb. 28, 1986 [JP] Japan .................... 61-45003
Mar. 14, 1986 [JP] Japan .................... 61-57740

[51] Int. Cl.$^4$ .............................................. C08F 20/10
[52] U.S. Cl. .................................................. 526/318.4
[58] Field of Search ...................................... 526/318.4

[56] References Cited

U.S. PATENT DOCUMENTS

| | | | |
|---|---|---|---|
| 2,945,013 | 7/1960 | Ott | 526/318.4 |
| 3,699,048 | 6/1972 | Kreuger et al. | 252/180 |
| 3,940,351 | 2/1976 | Schlatzer, Jr. | 526/318.4 |
| 4,008,164 | 2/1977 | Watson et al. | 252/8.55 B |
| 4,029,577 | 4/1977 | Godlewski | 210/58 |
| 4,196,272 | 4/1980 | Goretta et al. | 526/318.4 |
| 4,530,766 | 3/1985 | Hann et al. | 210/701 |

FOREIGN PATENT DOCUMENTS

| | | |
|---|---|---|
| 0018083 | 2/1985 | European Pat. Off. . |
| 53-2393 | 10/1978 | Japan . |
| 54-29315 | 6/1979 | Japan . |
| 59-5038 | 1/1984 | Japan . |
| 60-6777 | 10/1985 | Japan . |

Primary Examiner—Joseph L. Schofer
Assistant Examiner—N. Sarofim
Attorney, Agent, or Firm—Bryan, Cave, McPheeters and McRoberts

[57] ABSTRACT

A scale inhibitor containing as its active component a copolymer comprising acrylic acid, methacrylic acid and a $C_{1-8}$ alkyl ester of (meth)acrylic acid, the copolymer being
(a) about 1:4 to about 4:1 in the copolymerization mole ratio of acrylic acid to methacrylic acid,
(b) about 2:1 to about 40:1 in the copolymerization mole ratio of a total amount of acrylic acid and methacrylic acid to the $C_{1-8}$ alkyl ester of (meth) acrylic acid, and
(c) about 500 to about 15,000 in average molecular weight.

5 Claims, 6 Drawing Sheets

SCALE INHIBITOR

BACKGROUND OF THE INVENTION

1. Field of the Invention

The present invention relates to scale inhibitors comprising an organic synthetic high polymer as their active component.

More particularly, the invention relates to a chemical for inhibiting or preventing formation of scale which occurs in aqueous systems owing to increases in the concentrations of hardness components, heavy metal ions, anions, etc., increased alkalinity, increased temperature and the like.

2. Description of the Prior Art

Typical of aqueous systems wherein scale poses problems are boiler water, slag cooling water, industrial cooling water used by a single passage or recycled, water from the coagulating sedimentation treatment of water having collected therein the dust from the exhaust gases of blast furnaces or converters, etc.

Typically, scales include calcium carbonate, calcium phosphate or like calcium-type scale, and zinc phosphate, zinc carbonate, zinc sulfate, zinc hydroxide or like zinc-type scale.

Problems involved in the formation of such scale will be described below in detail.

Various effective chemicals have heretofore been developed and used for inhibiting calcium carbonate scale in industrial water systems. These chemicals include, for example, phosphorus-containing compounds (polyphosphoric acid salts and phosphonic acids), polyacrylic acids, copolymers of acrylic acid and methyl or ethyl ester of (meth)acrylic acid (see Unexamined Japanese Patent Publication No. SHO 53-2393), copolymers containing a 2-hydroxyalkyl (meth)acrylate (see Examined Japanese Patent Publication No. SHO 54-29315), etc.

Among these chemicals, phosphorus-containing compounds, especially inexpensive polyphosphoric acids, are widely used. Also widely used for inhibiting the corrosion of devices or apparatus are systems incorporating such a phosphorus-containing compound singly or in combination with a zinc ion donating compound.

The presence of the phosphorus-containing compound of course inhibits, or prevents the formation of, calcium carbonate scale in the system, whereas the system encounters another problem in that the phosphorus-containing compound itself is liable to form calcium phosphate scale or zinc phosphate scale. Thus, the use of the compound is invariably limited. In recent years, furthermore, it is generally desired to use industrial water as recycled if possible, instead of a single passage, for savings in water, so that the substances in the water are retained therein for a prolonged period of time and become concentrated. The phosphorus-containing compound, when present in such water, hydrolyzes to release phosphate ions, which in turn react with hardness components in the water or with zinc ions added thereto to inevitably form calcium phosphate scale or zinc phosphate scale.

Accordingly, it may be attempted to use a non-phosphorus type scale inhibitor conjointly with the phosphorus compound, but the inhibitor, even if effective on calcium carbonate scale like those mentioned above, actually exhibits little or no effect on calcium phosphate scale or zinc phosphate scale when used in a usual amount.

It also appears likely to use in combination with the phosphorus compound acrylic acid-methacrylic acid-itaconic acid copolymer which is known as a precipitation inhibitor for calcium phosphate (see Unexamined Japanese Patent Publication No. SHO 60-6777) and which is relatively similar in structure to the scale inhibitor of the present invention. However, when used in a small amount, the copolymer is not fully effective, actually failing to inhibit phosphate scale.

On the other hand, the dust collecting water used for blast furnace exhaust gas contains iron oxide and iron hydroxide, which are the main components of the dust, and further zinc ion, calcium ion, magnesium ion, etc. in large quantities and is not reusable as it is by recycling. Accordingly, a recycling system is widely used in which the dust collecting water is subjected to coagulating sedimentation treatment for the removal of the dust components before reuse. The coagulating sedimentation treatment is conducted generally by adding an alkali (e.g. caustic soda) to the dust collecting water to render the water alkaline and also adding a high polymer coagulant (such as polyacrylamide). When the treatment is conducted, for example, in a thickener, iron oxide, iron hydroxide, zinc ion, etc. can be removed efficiently in the form of a sediment by being coagulated and made sparingly soluble.

Nevertheless, the treatment results in another problem in that the system, which is made alkaline, is liable to permit formation of calcium carbonate scale especially on the surface of piping, although the dust component and zinc ion are removable. It therefore appears useful to lower the alkalinity to the greatest possible extent, but if the pH is reduced to less than 7.8, the zinc ion precipitation removal efficiency seriously decreases to entail the problem that zinc-type scale occurs although calcium carbonate scale is inhibited.

Consequently, the conventional coagulating sedimentation treatment requires the double chemical process of giving the dust collecting water an alkalinity of at least 7.8 in pH and further adding a calcium carbonate scale inhibitor to the resulting water (see Unexamined Japanese Patent Publication No. SHO 53-2393, Examined Japanese Patent Publication No. SHO 54-29315, etc.). Thus, the prior-art treatment is disadvantageous with respect to procedural efficiency and economy.

To overcome the drawback, investigations have been made as to the use of scale inhibitors after a neutral coagulating sedimentation treatment, whereas the above-mentioned known calcium carbonate scale inhibitors are ineffective for the inhibition of zinc-type scale when used in a usual amount and are difficult to use in neutral treatment.

The foregoing problems encountered with various aqueous systems would be solved by chemicals which are capable of inhibiting both calcium phosphate scale and zinc-type scale.

In this regard, we previously accomplished an invention providing a method of inhibiting calcium phosphate scale with use of a specific acrylic acid-methacrylic acid copolymer (about 1:4 to about 4:1 in copolymerization ratio and about 500 to about 15,000 in molecular weight) as disclosed in Examined Japanese Patent Publication No. SHO 59-5038.

However, the copolymer was found insufficient in its effect to inhibit calcium phosphate scale and also zinc-type scale.

Unexpectedly, nevertheless, we have found that the effect to inhibit calcium phosphate scale and zinc-type scale can be remarkably improved by introducing a $C_{1-8}$ alkyl ester residue of acrylic acid or methacrylic acid partially into the acrylic acid-methacrylic acid copolymer.

SUMMARY OF THE INVENTION

Accordingly, the present invention provides a scale inhibitor containing as its active component a copolymer comprising acrylic acid, methacrylic acid and a $C_{1-8}$ alkyl ester of (meth)acrylic acid, the copolymer having (a) a copolymerization mole ratio of about 1:4 to about 4:1 of acrylic acid to methacrylic acid, (b) a copolymerization mole ratio of about 2:1 to about 40:1 for the total amount of acrylic acid and methacrylic acid to the $C_{1-8}$ alkyl ester of (meth)acrylic acid, and (c) an average molecular weight of about 500 to about 15,000.

The scale inhibitor is usuable for boiler water, slag cooling water, industrial cooling water, water from the coagulating sedimentation treatment of water collecting the dust from blast furnace, converter or like exhaust gas, and various other aqueous systems to produce an outstanding inhibitory effect especially on calcium phosphate scale and various zinc-type scales in such aqueous systems.

DESCRIPTION OF THE PREFERRED EMBODIMENT

The acrylic acid-methacrylic acid-(meth)acrylic acid alkyl ester copolymer to be used in the present invention is specified in monomer copolymerization mole ratio and molecular weight. It is suitable that the copolymerization mole ratio of acrylic acid to methacrylic acid be about 1:4 to about 4:1. Otherwise, the copolymer exhibits a reduced scale inhibition ratio and is unsuited, as will become apparent from the comparative examples given later. Usually, the ratio is preferably in the range of 2:1 to 1:2, more preferably about 1:1.

The copolymerization mole ratio of a total amount of acrylic acid and methacrylic acid (acid components) to (meth)acrylic acid $C_{1-8}$ alkyl ester (ester component) is suitably about 2:1 to about 40:1, preferably about 2:1 to about 20:1. If the proportion of the acid components is smaller than about 2:1, the copolymer is difficult to prepare, exhibits a foaming property and is not suited. On the other hand, if the proportion of the ester component is lower than about 40:1, it is impossible to give greatly improved scale inhibitory ability to the known acrylic acid-methacrylic acid copolymer, hence unsuitable. The (meth)acrylic acid $C_{1-8}$ alkyl ester may be either a methacrylic acid alkyl ester or an acrylic acid alkyl ester, or a mixture of these esters. In view of ease of preparation of the copolymer, etc., the $C_{1-8}$ alkyl ester is preferably a $C_{1-4}$ alkyl ester, such as methyl, ethyl, propyl or butyl ester.

The acrylic acid-methacrylic acid-(meth)acrylic acid ester copolymer of the present invention is suitably about 500 to about 15,000 in molecular weight, as determined by the viscosity method.

Preferably, the molecular weight is 3,000 to 7,000. Even if the copolymerization ratio is 1:2, the copolymer exhibits a low scale inhibition ratio when having a great molecular weight, for example, of 50,000. Further copolymers smaller than 500 in molecular weight are unsuitable since the scale inhibition ratio achieved is low.

Such a copolymer is prepared from acrylic acid, methacrylic acid and the (meth)acrylic acid ester by heating these monomers in water, a water-containing solvent or organic solvent (such as lower alcohol, dioxane or aromatic solvent) along with a polymerization initiator (such as persulfate of ammonium or an alkali metal, hydrogen peroxide, benzoyl peroxide or like inorganic or organic peroxide, azobisisobutyronitrile or redox catalyst).

While the copolymer can be prepared by various polymerization processes using a usual initiator, it is desirable to polymerize the monomers in a solvent in view of ease of control of the reaction.

Although various solvents are selectively usable for this process, water and lower alcohols are easy to handle and therefore desirable from the viewpoint of solubility of the monomers in the solvent.

A suitable polymerization initiator is selected depending on the solvent to be used. For example, persulfate of ammonium or an alkali metal, hydrogen peroxide, etc. are suited for use in an aqueous medium. Benzoyl peroxide, lauroyl peroxide, cumene hydroperoxide, azobisisobutyronitrile, etc. are used in lower alcohols and like media. A suitable accelerator, such as an amine compound, may be selected for use with the initiator.

The polymerization temperature is usually in the range of 0° to 120° C. and is suitably determined according to the solvent and polymerization initiator used.

The acrylic acid units and methacrylic acid units of copolymers useful for the present invention include free acids and such acids as are partially or wholly converted to salts of sodium, potassium, lithium, ammonium, etc. For example, the copolymer is a powder when having a molecular weight of about 5,000 (free acid type) and is usable as it is, while it is usually suitable to use such a copolymer as dissolved in an aqueous solution of alkali hydroxide (e.g. caustic soda), alkali carbonate (e.g. sodium carbonate) or ammonia. A suitable organic amine is also usable. Thus, although usable in the form of a powder, the chemical of the present invention is usable in the form of an aqueous solution, as converted to a salt or using a salt compound.

The amount of the present copolymer to be used is dependent on the properties of the water to be treated therewith, for example, the kind and content of scale forming substance, pH, flow velocity, etc.

For example, when the copolymer is added to boiler water or industrial cooling water containing a phosphorus-containing compound to inhibit calcium phosphate or zinc phosphate scale, a satisfactory result can be achieved at a concentration of about 2 to about 20 ppm. Although the copolymer is usable at an increased concentration of up to about 200 ppm under severe conditions, such a case seldom exists, if ever. The copolymer is added all at one time or continuously in the usual manner. However, if the water to be treated has a pH of over 9, it is desirable to reduce the pH before the application of the present copolymer.

The aqueous system containing a phosphorus-containing compound is, for example, industrial water which has incorporated therein a polymerized phosphoric acid salt or phosphonic acid as a calcium carbonate scale inhibitor or corrosion inhibitor. From another viewpoint, therefore, the present invention also provides a method of treating an aqueous system by adding thereto the copolymer in combination with the phosphorus-containing compound to be added for the purpose of inhibiting scale or corrosion.

On the other hand, when the present copolymer is to be used for the coagulating sedimentation treatment of water collecting dust from blast furnace exhaust gas to inhibit zinc-type scale, it is suitable to apply 0.3 to 5 ppm of the copolymer to the water in the recycling system for the treatment. This makes it possible to subject the dust collecting water to the coagulating sedimentation treatment in neutral condition although this mode of treatment has been heretofore difficult to practice owing to marked formation of zinc-type scale, further making it possible to reduce the amount of alkali conventionally needed for the treatment or to obviate the use of alkali. From another viewpoint, therefore, the prevent invention provides a method of treating water having collected therein dust from blast furnace exhaust gas by subjecting the water to a coagulating sedimentation treatment in neutral condition for recycling and adding the copolymer to the resulting water.

The chemical and the method of the invention are effective also for inhibiting calcium carbonate scale. Satisfactory results can then be achieved using the chemical usually in an amount of about 0.5 to about 10 ppm.

Experimental Example 1

Concentrated test water was prepared with the properties shown in Table 1 (corresponding to the municipal water in Osaka as concentrated threefold), then adjusted to a pH of 7.6 and used for testing scale inhibitors for inhibitory effect on calcium phosphate scale by the following method.

To the test water were added 20 ppm, calculated as $PO_4^{3-}$, of sodium hexametaphosphate, 20 ppm, calcualted as $PO_4^{3-}$, of disodium hydrogenphosphate and a specified amount of the scale inhibitor. The water was then maintained at 60° C. for 2 hours while being stirred by an agitator at 200 r.p.m. The test solution was thereafter filtered with No. 6 filter paper, and the calcium ion and total phosphoric acid concentrations of the filtrate were measured. From these values and the corresponding concentrations measured before the testing, the amount of scale deposition (mg/liter) per liter of the solution was calculated. The scale inhibition ratio was calculated from the following equation.

$$\text{Scale inhibition ratio (\%)} = \frac{S_1 - S_2}{S_1} \times 100$$

wherein $S_1$ is the amount of scale deposition (mg/liter) in the absence of the inhibitor, and $S_2$ is the amount of scale deposition (mg/liter) when the inhibitor was used.

FIGS. 1 to 4 show the inhibitory effects achieved.

TABLE 1

| Quality of concentrated test water | |
| --- | --- |
| pH | 7.3 |
| Electric conductivity (μS/cm) | 580 |
| Acid consumption (pH 4.8) (mg $CaCO_3$/l) | 70 |
| Total hardness (mg $CaCO_3$/l) | 150 |
| Calcium hardness (mg $CaCO_3$/l) | 120 |
| Chloride ion (mg $Cl^-$/l) | 70 |
| Sulfate ion (mg $SO_4^{2-}$/l) | 50 |
| Ionic silica (mg $SiO_2$/l) | 20 |

Figure 1:
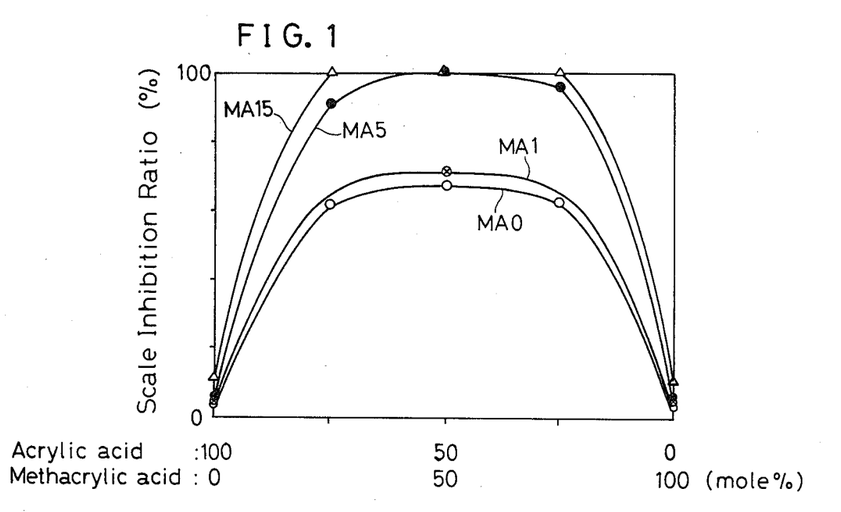
FIGS. 1 to 4 are graphs showing the effect of scale inhibitors of the invention and comparative examples on calcium phosphate scale.
Figure 2:
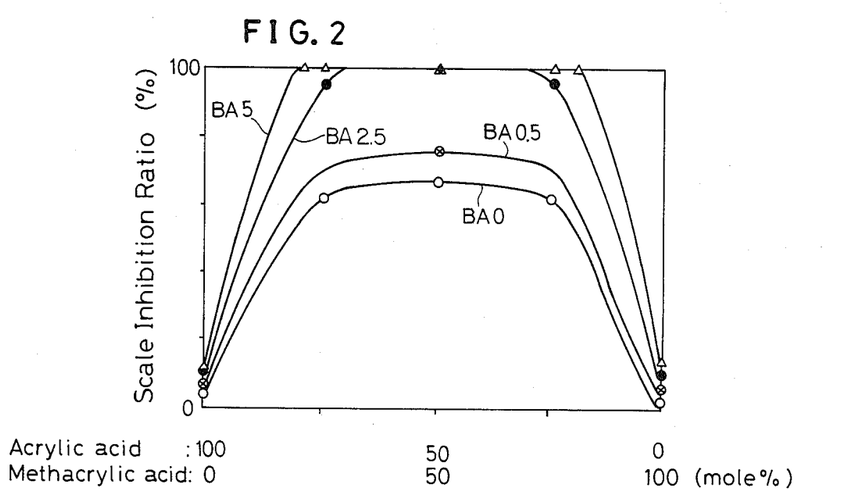

Description of FIGS. 1 and 2

FIGS. 1 and 2 show the relation between the mole ratio of acrylic acid to methacrylic acid and the scale inhibition ratio, as established by acrylic acidmethacrylic acid-(meth)acrylic acid alkyl ester copolymers varying in the mole ratio of acrylic acid and methacrylic acid combined to the alkyl (meth)acrylate.

More specifically stated with reference to FIG. 1, MA0 represents the relation between the mole ratio of acrylic acid to methacrylic acid and the scale inhibition ratio, as established by acrylic acid-methacrylic acid copolymers (comparative example). MA15 represents the relation between the mole ratio of acrylic acid to methacrylic acid and the scale inhibition ratio, as established by acrylic acid-methacrylic acid-methyl acrylate copolymers which vary in this acid ratio and which are 100:15 (6.7/1) in the mole ratio of (acrylic acid and methacrylic acid combined) to (methyl acrylate (MA) (example of the invention). MA5 represents the relation between the mole ratio of acrylic acid to methacrylic acid and the scale inhibition ratio, as established by acrylic acid-methacrylic acid-methyl acrylate copolymers which vary in this acid ratio and which are 100:5 (20/1) in the mole ratio of (acrylic acid and methacrylic acid combined) to (methyl acrylate) (example of the invention). MA1 represents the scale inhibition ratio achieved by acrylic acid-methacrylic acid-methyl acrylate copolymers which are 1:1 in the mole ratio of acrylic acid to methacrylic acid and which are 100:1 in the mole ratio of (acrylic acid and methacrylic acid combined) to (methyl acrylate) (comparative example).

With reference to FIG. 2, BA0 represents the same relation as MA0 mentioned above. BA5 represents the relation between the mole ratio of acrylic acid to methacrylic acid and the scale inhibition ratio, as established by acrylic acid-methacrylic acid-butyl acrylate copolymers which vary in this acid ratio and which are 100:5 (20/1) in the mole ratio of (acrylic acid and methacrylic acid combined) to (butyl acrylate), and BA2.5 represents like relation as established by similar copolymers which are 100:2.5 (40:1) in the mole ratio of (acrylic acid and methacrylic acid combined) to (butyl acrylate) (both examples of the invention). BA0.5 represents the scale inhibition ratio achieved by acrylic acid-methacrylic acid-butyl acrylate copolymers which are 1:1 in the mole ratio of acrylic acid to methacrylic acid and which are 100:0.5 in the mole ratio of (acrylic acid and methacrylic acid combined) to (butyl acrylate) (comparative example).

The copolymers are 3,000 in molecular weight and are used in an amount of 3 ppm.

Figure 3:
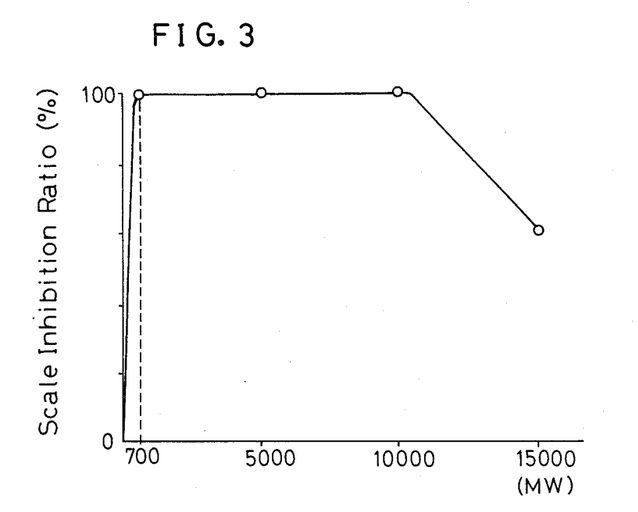
Figure 4:
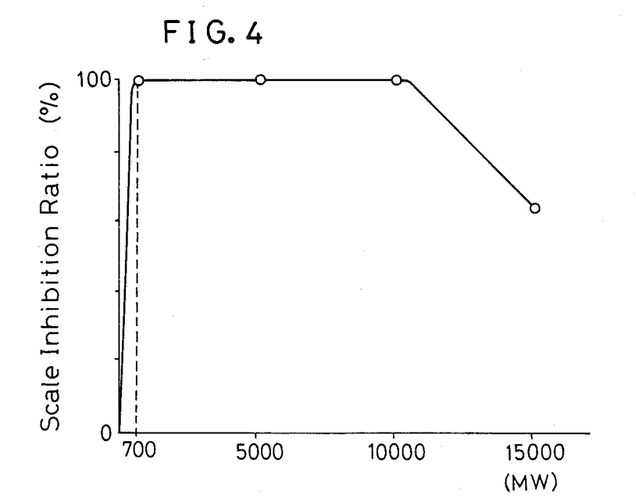

Description of FIGS. 3 and 4

FIG. 3 shows the relation between the molecular weight and the scale inhibition ratio of acrylic acid-methacrylic acid-methyl acrylate copolymers (which are 1:1 in the copolymerization mole ratio of acrylic acid to methacrylic acid and 20:3 in the mole ratio of acrylic acid and methacrylic acid combined to methyl acrylate).

Similarly, FIG. 4 shows the relation between the molecular weight and the scale inhibition ratio of acrylic acid-methacrylic acid-butyl acrylate copolymers (which are 1:1 in the copolymerization mole ratio of acrylic acid to methacrylic acid and 20:1 in the mole ratio of acrylic acid and methacrylic acid combined to butyl acrylate).

The copolymers are used in an amount of 3 ppm.

Experimental Example 2

The same experimental procedure as in the foregoing example was repeated except that various different ester groups were used. Table 2 shows the results along with those of comparative examples.

| Tc: test cell | Ti: inlet temperature sensor |
| Sp: test piece | To: outlet temperature sensor |
| Hb: heater | RT: receiving tank |
| P: recycling pump | Hi: test solution heater |
| Fm: flow meter | |

The test was conducted by the following method.

To 20 liters of concentrated test water (corresponding to the municipal water in Osaka as concentrated threefold, see Table 1) were added sodium hexametaphosphate to a concentration of 13 ppm calculated as $PO_4^{3-}$ and zinc chloride to 2 ppm calculated as $Zn^{2+}$ to prepare a test solution. A test piece (with a 20×20 mm liquid contact portion, made of copper (DCuP)) was heated with a heat load (heat flux: $30 \times 10^4$ Kcal/m²·h) while passing the test solution, serving as cooling water, through the test cell at a flow rate of 0.5 m/sec (with the

TABLE 2

| | | Copolymerization mole ratio | | | Molecular weight | Calcium phosphate scale inhibition ratio | | | Acid components/ester component |
|---|---|---|---|---|---|---|---|---|---|
| Ex. No. | Acrylic acid | Methacrylic acid | (Meth)acrylate | (symbol) | | 1 ppm | 2 ppm | 3 ppm | |
| Comp. 1 | 1 | 0 | | 0 | 3,000 | 4.8 | 5.0 | 5.6 | |
| Ex. 2 | 0 | 1 | | 0 | 3,000 | 4.6 | 4.9 | 5.3 | |
| 3 | 1 | 1 | | 0 | 3,000 | 10.2 | 32.1 | 66.3 | |
| 4 | 3 | 1 | | 0 | 3,000 | 7.6 | 29.7 | 60.8 | |
| 5 | 1 | 3 | | 0 | 3,000 | 7.9 | 28.5 | 61.2 | |
| 6 | 1 | 1 | | 0 | 1,000 | 9.8 | 30.0 | 64.1 | |
| Ex. 7 | 1 | 1 | MA | 0.1 | 3,000 | 18.5 | 71.0 | 100 | 20/1 |
| 8 | 1 | 1 | MA | 1 | 3,000 | 20.0 | 89.8 | 100 | 2/1 |
| 9 | 1 | 1 | MA | 0.5 | 8.000 | 19.9 | 85.0 | 100 | 4/1 |
| 10 | 1 | 1 | EA | 0.1 | 5,000 | 23.8 | 80.3 | 100 | 20/1 |
| 11 | 3 | 1 | EA | 0.6 | 3,000 | 15.5 | 85.0 | 100 | 6.7/1 |
| 12 | 1 | 3 | BA | 0.2 | 1,000 | 20.0 | 86.8 | 100 | 20/1 |
| 13 | 2 | 1 | MMA | 1.05 | 700 | 22.2 | 89.9 | 100 | About 3/1 |
| 14 | 1 | 1 | EMA | 0.5 | 3,000 | 25.3 | 92.1 | 100 | 4/1 |
| 15 | 1 | 4 | EHMA | 0.5 | 6,000 | 16.6 | 82.1 | 100 | 10/1 |
| 16 | 4 | 1 | EA | 0.25 | 3,000 | 15.5 | 83.8 | 100 | 20/1 |
| 17 | 1 | 1 | EHMMA | 0.1 | 3,000 | 25.8 | 92.1 | 100 | 20/1 |
| 18 | 1 | 1 | EMA | 1 | 1,000 | 30.0 | 95.5 | 100 | 2/1 |
| 19 | 1 | 2 | MMA | 0.15 | 5,000 | 16.8 | 85.3 | 100 | 20/1 |
| Comp. 20 | Maleic acid homopolymer | | | | 1,000 | 3.8 | 4.8 | 5.3 | |
| Ex. 21 | Acrylic acid-maleic acid copolymer | | | | 5,000 | 4.2 | 4.7 | 5.0 | — |
| 22 | None | | | | | | 0 | | |
| Ex. 23 | 1 | 1 | BA | 0.1 | 3,000 | 22.0 | 90.1 | 100 | 20/1 |
| 24 | 1 | 1 | EA 0.2 MMA | 0.2 | 8,000 | 25.9 | 93.2 | 100 | 5/1 |
| 25 | 1 | 1 | BA | 0.1 | 8,000 | 20.1 | 91.8 | 100 | 20/1 |
| Comp. 26 | Acrylic acid/methyl acrylate/2-hydroxyethyl acrylate (70:4:26) | | | | 3,000 | 5.8 | 7.9 | 15.4 | |
| Ex. 27 | Acrylic acid/methyl acrylate (80:20) | | | | 3,000 | 4.3 | 6.0 | 10.2 | — |
| 28 | Acrylic acid/methacrylate acid/itaconic acid (45:40:15) | | | | 3,000 | 6.2 | 8.5 | 18.0 | |

Symbols given above and also in Table 8 to follow represent the following.
MA: methyl acrylate
EA: ethyl acrylate
BA: butyl acrylate
EHMA: ethylhexyl acrylate
MMA: methyl methacrylate
EMA: ethyl methacrylate
EHMMA: ethylhexyl methacrylate

Example 1

Figure 5:
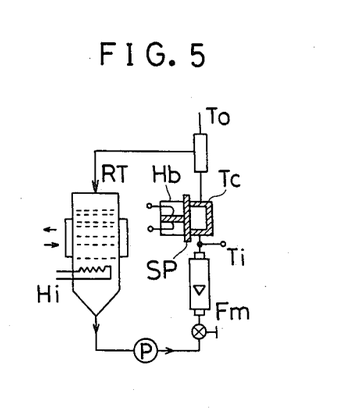
FIGS. 5 and 6 are diagrams showing the systems used in Examples 1 and 2, respectively, according to the invention.

An acrylic acid-methacrylic acid-methyl acrylate copolymer (1:1:0.3 in copolymerization ratio, 3,000 in molecular weight) was tested for scale inhibitory effect using the apparatus shown in FIG. 5. The symbols in FIG. 5 mean the following.

solution temperature set to 50° C. at the cell inlet). The test was conducted for 5 days, and the weight of the test piece was thereafter measured. The rate of scale deposition (m.c.m. (mg/cm²·month)) was determined from the weight difference resulting from the testing.

The scale deposited on the test piece was dissolved with hydrochloric acid (15 w/w %) and then analyzed. Tables 3 and 4 show the results.

TABLE 3

Rate of scale deposition

| Test No. | Copolymer Mole ratio of components | | | Molecular weight | Amount used (ppm) | Rate of scale deposition (m.c.m.) | Inhibition ratio (%) |
|---|---|---|---|---|---|---|---|
| | Acrylic acid | Methacrylic acid | Ethyl acrylate | | | | |
| 1 | No inhibitor used | | | — | — | 91.0 | — |
| 2 | 1 | 1 | 0.3 | 3,000 | 2.4 | 8.6 | 90.5 |
| 3 | 1 | 1 | 0.3 | 3,000 | 3 | 5.4 | 94.1 |

TABLE 4

Results of scale analysis (mg)

| | Test No. | | |
|---|---|---|---|
| | 1 | 2 | 3 |
| Total amount of deposition | 303.3 | 28.7 | 18.0 |
| $Fe_2O_3$ | Trace | Trace | Trace |
| CaO | 114.3 | 6.9 | 4.0 |
| MgO | 8.5 | 0.29 | 0.18 |
| ZnO | 30.3 | 2.3 | 1.2 |
| $P_2O_5$ | 118.3 | 7.0 | 4.0 |
| CuO | 15.5 | 3.6 | 2.7 |

Example 2

Figure 6:
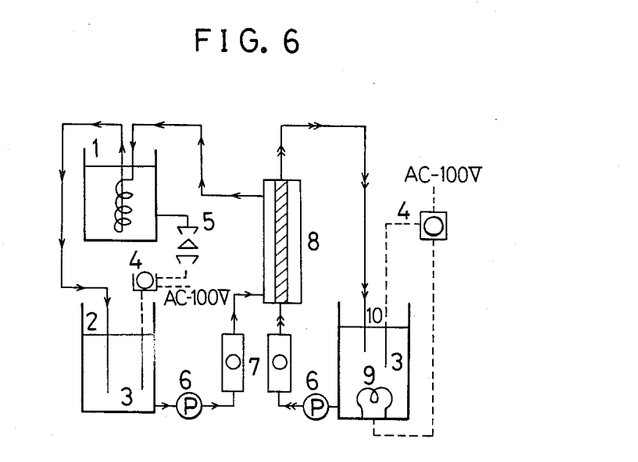

An acrylic acid-methacrylic acid-methyl methacrylate copolymer (1:1:0.3 in copolymerization ratio, 3,000 in molecular weight) was tested for scale inhibitory effect under the conditions and by the method stated below, using the apparatus of FIG. 6. The rate of scale deposition (m.c.m.) was measured in the same manner as in Example 1. Table 5 shows the quality of the test water used, and Table 6 the deposition rate measured. The following parts are designated by the reference numerals 1 to 10 shown in FIG. 6.

| 1: cooling water pit | 2: test water pit |
|---|---|
| 3: temperature sensor | 4: temperature controller |
| 5: solenoid valve | 5: magnet pump |
| 7: flow meter | 8: test portion |
| 9: heater | 10: hot water pit |

Test conditions

Test water: Concentrated water (corresponding to the municipal water in Osaka as concentrated fivefold, see Table 5) having added thereto 28 ppm of sodium hexametaphosphate (26 ppm calculated as $PO_4^{3-}$) and 8 ppm of zinc chloride (3.8 ppm calculated as $Zn^{2+}$).

| Amount of water recycled | 15 liters/min |
|---|---|
| Amount of water held | 10 liters |
| Temperature of test water | 40° C. |
| Flow velocity of test water | 0.5 m/sec |
| Temperature of hot water | 70° C. |
| Flow rate of hot water | 0.8 liter/min |
| Rate of heat transfer | 30,000 cal/hr · m² |
| Residence time | 48 hours |
| Test period | 3 days |
| Material of test tube | SUS304 |

Test method

1. The test water is placed into the test water pit and recycled by the pump.
2. Pure water is placed into the hot water pit and recycled by the pump to start testing.

(The test portion has a double-wall structure, i.e. an inner test tube and an outer tube. The test water is passed outside the test tube through which hot water is passed to transfer the heat through the test tube wall. To obviate deposition of scale inside the test tube, pure water is used as the hot water. Scale is deposited on the test tube only from the test water outside the test tube.)

3. The test water is heated only with the heat transferred through the test tube. The temperature of hot water and test water is adjusted by the temperature controller, heater and solenoid valve. The flow rate is adjusted by the flow meter and an unillustrated valve.

TABLE 5

Quality of concentrated test water

| pH | 8.3 |
|---|---|
| Electric conductivity (μS/cm) | 870 |
| Acid consumption (pH 4.8) (mg $CaCO_3$/l) | 125 |
| Total hardness (mg $CaCO_3$/l) | 250 |
| Calcium hardness (mg $CaCO_3$/l) | 200 |
| Chloride ion (mg $Cl^-$/l) | 125 |
| Sulfate ion ($SO_4^{2-}$/l) | 75 |
| Ionic silica (mg $SiO_2$/l) | 35 |

TABLE 6

Rate of scales deposition

| Test No. | Mole ratio of components | | | Molecular weight | Amount used (ppm) | Rate of scale deposition (m.c.m) |
|---|---|---|---|---|---|---|
| | Acrylic acid | Methacrylic acid | Ethyl acrylate | | | |
| 1 | No inhibitor | | | — | — | 7.9 |
| 2 | 1 | 1 | 0.3 | 3,000 | 2.4 | 0.9 |

Thus, the method of the present invention greatly inhibits, or prevents the formation of, calcium phosphate scale.

Experimental Example 3

To the concentrated test water listed in Table 7 were added zinc sulfate in an amount of 8 ppm calculated as $Zn^{2+}$ and a specified quantity of scale inhibitor. The solution was then maintained at 50° C. for 24 hours while being stirred by an agitator at 100 r.p.m. The test solution was thereafter filtered with No. 6 filter paper, and the zinc ion concentration of the filtrate was measured. From this value and the corresponding concentration measured before the testing, the amount of scale deposition (mg/liter) per liter of the solution was calculated. The scale inhibition ratio was calculated in the same manner as in Experimental Example 1 for the evaluation of scale inhibitory effect. FIGS. 7 to 10 and Table 8 show the results.

TABLE 7

| Quality of concentrated test water | |
|---|---|
| pH | 7.3 |
| Electric conductivity (μS/cm) | 580 |
| Acid consumption (pH 4.8) (mg $CaCO_3$/l) | 70 |
| Total hardness (mg $CaCO_3$/l) | 150 |
| Calcium hardness (mg $CaCO_3$/l) | 120 |
| Chloride ion (mg $Cl^-$/l) | 70 |
| Sulfate ion (mg $SO_4^{2-}$/l) | 50 |
| Ionic silica (mg $SiO_2$/l) | 20 |

Figure 7:
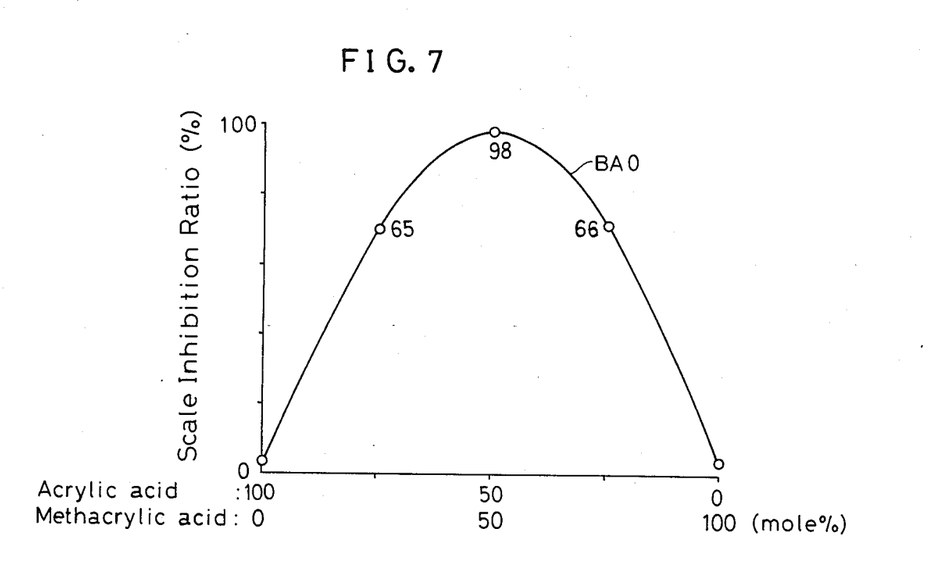
FIGS. 7 to 10 are graphs showing the effect of the scale inhibitors of the invention on zinc-type scale.
Figure 8:
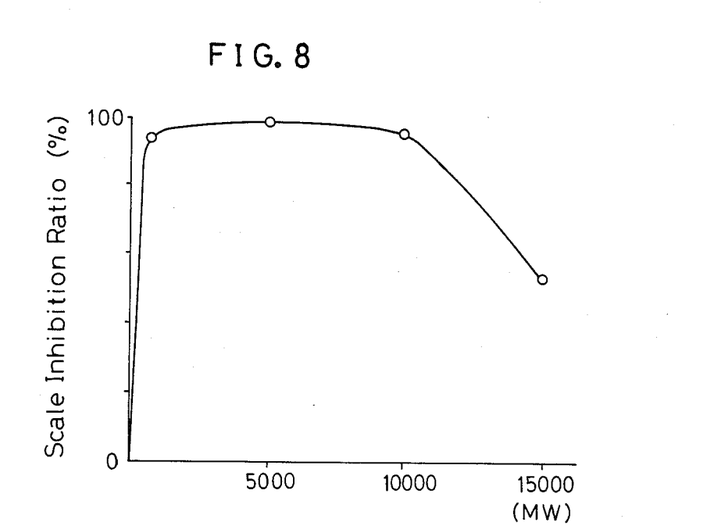

Description of FIGS. 7 and 8

FIG. 7 is a graph showing the relation between the copolymerization ratio (mole %) of acrylic acid to methacrylic acid and the scale inhibition ratio, as established by acrylic acid-methacrylic acid copolymers (average molecular weight about 3,000, concentration 6 ppm).

FIG. 8 is a graph showing the relation between the molecular weight and the scale inhibition ratio, as established by acrylic acid-methacrylic acid copolymers in the copolymerization ratio of 1:1 (at a concentration of 6 ppm).

Figure 9:
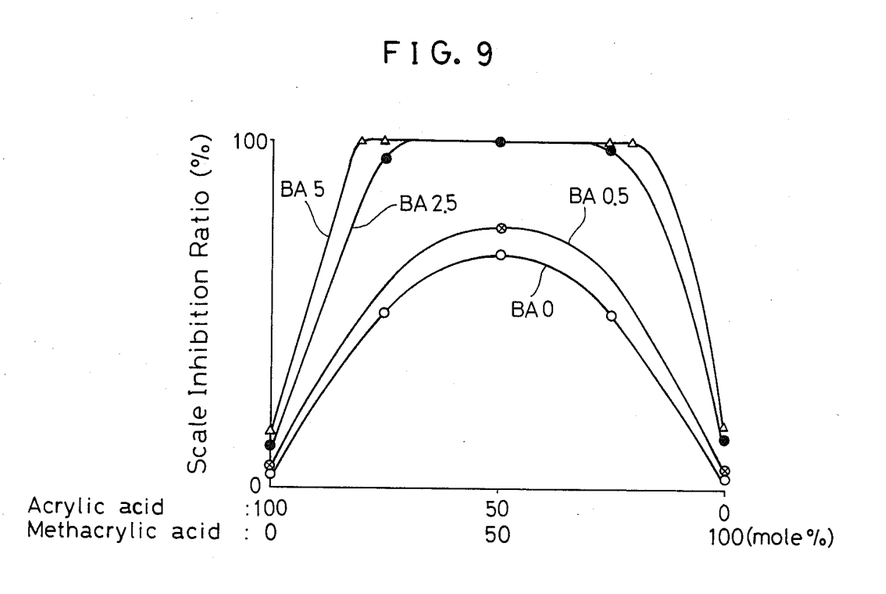
Figure 10:
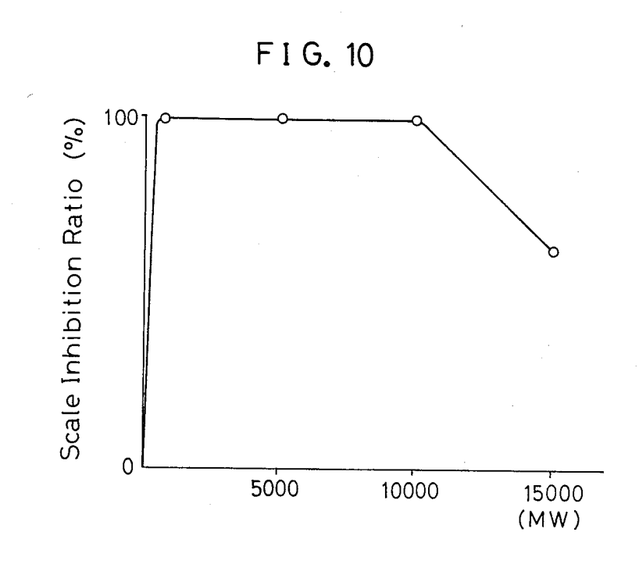

Description of FIGS. 9 and 10

FIG. 9 shows the relation between the copolymerization ratio (mole ratio) of acrylic acid to methacrylic acid and the scale inhibition ratio, as established by acrylic acid-methacrylic acid-butyl acrylate copolymers varying in this copolymerization ratio and also in the mole ratio of acrylic acid and methacrylic acid combined to butyl acrylate.

More specifically stated with reference to FIG. 9, BA0 represents the relation between the copolymerization ratio (unit: mole %) of acrylic acid to methacrylic acid and the scale inhibition ratio, as established by acrylic acid-methacrylic acid copolymers. BA0.5 represents the relation between the copolymerization ratio (unit: mole %) of acrylic acid to methacrylic acid and the scale inhibition ratio, as established by acrylic acid-methacrylic acid-butyl acrylate copolymers which vary in this copolymerization ratio and which are 200:1 in the mole ratio of (acrylic acid and methacrylic acid combined) to (butyl acrylate). BA2.5 represents the relation between the copolymerization ratio (unit: mole %) of acrylic acid to methacrylic acid and the scale inhibition ratio, as established by acrylic acid-methacrylic acid-butyl acrylate copolymers which vary in this copolymerization ratio and which are 100:2.5 (40:1) in the mole ratio of (acrylic acid and methacrylic acid combined) to (butyl acrylate). BA5 represents like relation as established by similar copolymers which are 100:5 (20:1) in the mole ratio of (acrylic acid and methacrylic acid combined) to (butyl acrylate).

The copolymers are 3,000 in molecular weight and are used in an amount of 3 ppm.

TABLE 8

| | Copolymerization mole ratio | | | | Molecular weight | Zinc-type scale inhibition ratio | | | Acid components/ester component |
|---|---|---|---|---|---|---|---|---|---|
| Ex. No. | Acrylic acid | Methacrylic acid | (Meth)acrylate | (symbol) | | 1 ppm | 2 ppm | 3 ppm | |
| Comp. Ex. | | | | | | | | | |
| 1 | 1 | 0 | | 0 | 3,000 | 2.0 | 3.1 | 3.2 | |
| 2 | 0 | 1 | | 0 | 3,000 | 1.8 | 2.0 | 2.9 | |
| 3 | 1 | 1 | | 0 | 3,000 | 19.1 | 43.1 | 68.7 | |
| 4 | 3 | 1 | | 0 | 3,000 | 13.8 | 35.9 | 51.1 | |
| 5 | 1 | 3 | | 0 | 3,000 | 12.9 | 36.2 | 50.2 | |
| 6 | 1 | 1 | | 0 | 1,000 | 18.9 | 41.3 | 63.5 | |
| Ex. | | | | | | | | | |
| 7 | 1 | 1 | MA | 0.1 | 3,000 | 21.5 | 69.1 | 100 | 20/1 |
| 8 | 1 | 1 | MA | 1 | 3,000 | 26.9 | 75.3 | 100 | 2/1 |
| 9 | 1 | 1 | MA | 0.5 | 8,000 | 25.5 | 73.1 | 100 | 4/1 |
| 10 | 1 | 1 | EA | 0.1 | 5,000 | 26.3 | 76.1 | 100 | 20/1 |
| 11 | 3 | 1 | EA | 0.6 | 3,000 | 18.8 | 68.1 | 100 | 6.7/1 |
| 12 | 1 | 3 | BA | 0.2 | 1,000 | 18.2 | 67.9 | 100 | 20/1 |
| 13 | 2 | 1 | MMA | 1.05 | 700 | 23.3 | 70.0 | 100 | About 3/1 |
| 14 | 1 | 1 | EMA | 0.5 | 3,000 | 23.3 | 86.8 | 100 | 4/1 |
| 15 | 1 | 4 | EHMA | 0.5 | 6,000 | 15.2 | 71.1 | 100 | 10/1 |
| 16 | 4 | 1 | EA | 0.25 | 3,000 | 15.2 | 70.3 | 100 | 20/1 |
| 17 | 1 | 1 | EHMMA | 0.1 | 3,000 | 27.8 | 80.8 | 100 | 20/1 |
| 18 | 1 | 1 | EMA | 1 | 1,000 | 29.9 | 83.9 | 100 | 2/1 |
| 19 | 1 | 2 | MMA | 0.15 | 5,000 | 19.1 | 83.5 | 100 | 20/1 |
| Comp. Ex. | | | | | | | | | |
| 20 | Maleic acid homopolymer | | | | 1,000 | 2.1 | 2.1 | 2.3 | — |
| 21 | Acrylic acid-maleic acid copolymer | | | | 5,000 | 1.9 | 2.2 | 2.3 | |
| 22 | None | | | | | | 0 | | |
| Ex. | | | | | | | | | |
| 23 | 1 | 1 | BA | 0.1 | 3,000 | 25.8 | 79.1 | 100 | 20/1 |
| 24 | 1 | 1 | EA 0.2 MMA | 0.2 | 8,000 | 30.0 | 85.1 | 100 | 5/1 |
| 25 | 1 | 1 | BA | 0.1 | 8,000 | 27.2 | 77.7 | 100 | 20/1 |
| Comp. Ex. | | | | | | | | | |
| 26 | Acrylic acid/methyl acrylate/2-hydroxyethyl acrylate (70:4:26) | | | | 3,000 | 5.4 | 12.0 | 20.5 | — |
| 27 | Acrylic acid/methyl acrylate (80:20) | | | | 3,000 | 5.9 | 19.5 | 39.4 | |
| 28 | Acrylic acid/methacrylic acid/itaconic acid (45:40:15) | | | | 3,000 | 10.0 | 24.3 | 40.0 | |

Example 3

Scale inhibitors were tested for inhibitory effect at varying pH values using dust collecting water at the outlet of a thickener included in the blast furnace dust collecting water system of an iron mill.

Test method

Figure 11:
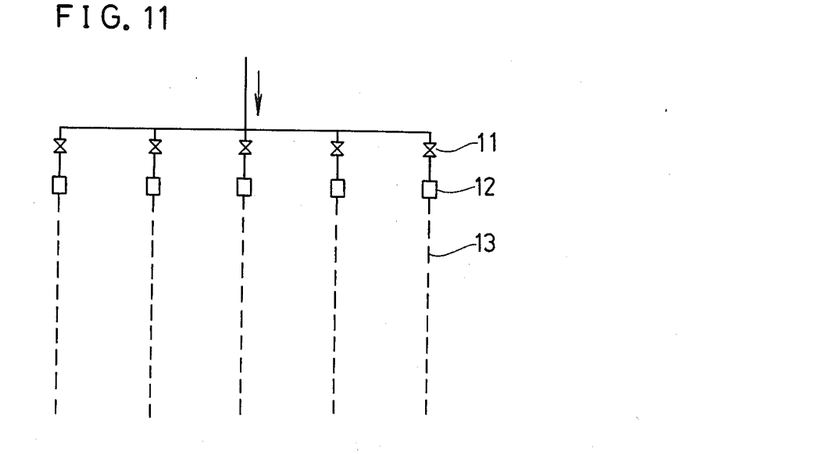
FIG. 11 is a diagram schematically showing an apparatus used in Example 3.

The apparatus shown in FIG. 11 was used, varying the pH of the dust collecting water by varying the amount of sodium hydroxide added to the water at the inlet of the thickener.

Figure 12:
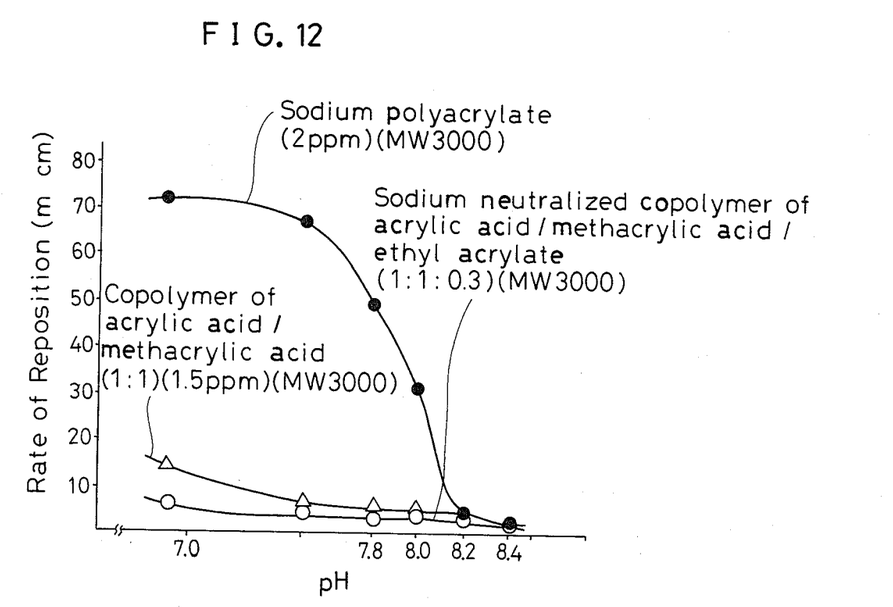
FIG. 12 is a graph showing the effect of scale inhibitors of the invention and comparative examples on zinc-type scale.

The amount of scale deposited on test tubes (made of SUS-304, 3/8B×150 mm) indicated at 13 in FIG. 11 was measured to calculate the rate of scale deposition (m.c.m., mg/cm²·month). FIG. 12 shows the relation between the pH and the rate of scale deposition. Table 9 shows the results of analysis of scale formed at pH 8.0 and pH 7.5 in the absence of the inhibitor. Table 10 shows the quality of water at the thickener outlet at pH 8.0 and pH 7.5. Indicated at 11 in FIG. 11 are valves, and at 12 inhibitor feeders.

TABLE 9

| Results of scale analysis (%) | | |
|---|---|---|
| | pH 7.5 | pH 8.0 |
| Ignition loss | 21 | 40 |
| $Fe_2O_3$ | 6.3 | 5.0 |
| CaO | 0.3 | 48 |
| MgO | <0.1 | 0.5 |
| ZnO | 60 | 1.3 |

TABLE 10

| Quality of water analyzed | | |
|---|---|---|
| | pH 7.5 | pH 8.0 |
| pH | 7.5 | 8.0 |
| Electric conductivity (μS/m) | 7000 | 8000 |
| Acid consumption (pH 4.8) (mg $CaCO_3$/l) | 280 | 400 |
| Total hardness (mg $CaCO_3$/l) | 1000 | 780 |
| Calcium hardness (mg $CaCO_3$/l) | 790 | 650 |
| Total iron (mg Fe/l) | 2.8 | 3.9 |
| Total zinc (mg $Zn^{2+}$/l) | 73.2 | 1.0 |
| Zinc ion (mg $Zn^{2+}$/l) | 60.6 | 0.2 |
| Chloride ion (mg $Cl^-$/l) | 2200 | 2100 |
| Sulfate ion (mg $SO_4^{2-}$/l) | 220 | 260 |

The above results indicate that the method of the present invention remarkably inhibits, or prevents formation of, zinc-type scale.

What we claim is:

1. A scale inhibitor containing as its active component a copolymer consisting essentially of acrylic acid, methacrylic acid and $C_{1-8}$ alkyl ester of acrylic acid, methacrylic acid, or combinations thereof, the copolymer having:
    (a) a copolymerization mole ratio of acrylic acid to methacrylic acid of about 1:4 to about 4:1;
    (b) a copolymerization mole ratio of a total amount of acrylic acid and methacrylic acid to the $C_{1-8}$ alkyl ester of about 2:1 to about 10:1; and
    (c) about 500 to about 15,000 in average molecular weight.

2. A scale inhibitor as defined in claim 1 wherein the copolymerization mole ratio of acrylic acid to methacrylic acid is 2:1 to 1:2.

3. A scale inhibitor as defined in claim 2 wherein the copolymerization mole ratio of acrylic acid to methacrylic acid is about 1:1.

4. A scale inhibitor as defined in claim 1, wherein the alkyl ester is a $C_{1-4}$ alkyl ester of acrylic or methacrylic acid, or combinations thereof.

5. A scale inhibitor as defined in claim 1 wherein the copolymer is about 3,000 to about 7,000 in average molecular weight.

* * * * *